United States Patent
Hu

(10) Patent No.: US 9,703,971 B2
(45) Date of Patent: Jul. 11, 2017

(54) SENSITIVE OPERATION VERIFICATION METHOD, TERMINAL DEVICE, SERVER, AND VERIFICATION SYSTEM

(71) Applicant: TENCENT TECHNOLOGY (SHENZHEN) COMPANY LIMITED, Shenzhen (CN)

(72) Inventor: Shuai Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/443,541

(22) PCT Filed: Nov. 4, 2013

(86) PCT No.: PCT/CN2013/086483
§ 371 (c)(1),
(2) Date: May 18, 2015

(87) PCT Pub. No.: WO2014/075566
PCT Pub. Date: May 22, 2014

(65) Prior Publication Data
US 2015/0302215 A1    Oct. 22, 2015

(30) Foreign Application Priority Data
Nov. 16, 2012    (CN) .......................... 2012 1 0464970

(51) Int. Cl.
*G06F 21/62*    (2013.01)
*H04L 9/32*    (2006.01)
(Continued)

(52) U.S. Cl.
CPC ........ *G06F 21/62* (2013.01); *G06F 17/30887* (2013.01); *G06F 21/305* (2013.01);
(Continued)

(58) Field of Classification Search
CPC .... G06F 21/62; G06F 17/30; G06F 17/30887; H04L 29/06; H04L 63/12
(Continued)

(56) References Cited

U.S. PATENT DOCUMENTS

2009/0077373 A1* 3/2009 Kramer ................... H04L 63/12
713/155
2012/0160912 A1* 6/2012 Laracey ............. G06Q 20/1085
235/379

FOREIGN PATENT DOCUMENTS

CN    101022489 A    8/2007
CN    101388125 A    3/2009
(Continued)

OTHER PUBLICATIONS

International Search Report issued Feb. 20, 2014 re: Application No. PCT/CN2013/086483.
(Continued)

*Primary Examiner* — Anthony Brown
*Assistant Examiner* — Samuel Ambaye
(74) *Attorney, Agent, or Firm* — Cantor Colburn LLP

(57) ABSTRACT

The present disclosure discloses a sensitive operation verification method, a terminal device, a server, and a verification system. The method includes: scanning, by a first terminal device, a two-dimensional code for initiating a sensitive operation, and obtaining information in the two-dimensional code, the information in the two-dimensional code being at least used to uniquely determine the sensitive operation; and sending, by the first terminal device, a first verification request to a verification server, the first verification request carrying verification information of the first terminal device and the information in the two-dimensional code.

10 Claims, 5 Drawing Sheets

A first terminal device scans a two-dimensional code for initiating a sensitive operation, and obtains information in the two-dimensional code, where the information in the two-dimensional code is at least used to uniquely determine the sensitive operation — 101

The first terminal device sends a first verification request to a verification server, where the first verification request carries verification information of the first terminal device and the information in the two-dimensional code, so that the verification server performs verification according to the verification information of the first terminal device, where the verification information is used to determine user identity information; and allows, when the verification succeeds and in a state that does not require a user to log in, the sensitive operation determined by the information in the two-dimensional code and corresponding to the user identity information to proceed — 102

(51) Int. Cl.
*G06F 17/30* (2006.01)
*H04L 29/06* (2006.01)
*G06F 21/30* (2013.01)

(52) U.S. Cl.
CPC ............ *H04L 9/3228* (2013.01); *H04L 63/10* (2013.01); *H04L 63/12* (2013.01); *G06F 2221/2149* (2013.01)

(58) Field of Classification Search
USPC ........ 713/155, 156, 159, 172, 173; 726/4, 5, 726/10, 30
See application file for complete search history.

(56) References Cited

FOREIGN PATENT DOCUMENTS

| CN | 102571825 A | 7/2012 |
| CN | 102752444 A | 10/2012 |
| EP | 1688891 A1 | 8/2006 |

OTHER PUBLICATIONS

Written Opinion issued Feb. 20, 2014 re: Application No. PCT/CN2013/086483.
Written Opinion issued Feb. 20, 2014 re: Application No. PCT/CN2013/086483; pp. 1-13; citing: CN 102752444 A.
CN Office Action issued Jan. 21, 2016 re: Application No. 201210464970.8; pp. 1-6; citing: CN 102752444A.

\* cited by examiner

SENSITIVE OPERATION VERIFICATION METHOD, TERMINAL DEVICE, SERVER, AND VERIFICATION SYSTEM

RELATED APPLICATION

This application claims priority to Chinese Patent Application No. 201210464970.8, filed with the Chinese Patent Office on Nov. 16, 2012 and entitled "SENSITIVE OPERATION VERIFICATION METHOD, TERMINAL DEVICE, SERVER, AND VERIFICATION SYSTEM", which is incorporated herein by reference in its entirety.

FIELD OF THE TECHNOLOGY

The present disclosure relates to the field of network technologies, and in particular, to a sensitive operation verification method, a terminal device, a server, and a verification system.

BACKGROUND OF THE DISCLOSURE

With development of a network application, online shopping, online games, online trading, and the like are increasingly richer; and a value of a network account of a user is increasingly higher, actions of stealing a user account and various virtual properties run wilder and wilder, and various account properties of the user face a very stern test. Therefore, when the user performs actions such as logging in to a network account, payment, and virtual property trading, it is indispensable to verify the real identity of the user.

Currently, identity verification is implemented mainly by the user by entering a static password or a dynamic password that is registered in advance to a computer or a terminal in another form. In this verification manner, by using either the static password or the dynamic password, the user is faced with a risk that a third party (an account stealer) may cheat the user with Trojan viruses or in another manner to obtain the password and pretend to be the user to perform verification. After the user enters an identity credential, the third party may steal the account by using this credential, and moreover, this verification manner increases learning costs and operation costs for the user.

SUMMARY

To solve the problem of the existing technology, embodiments of the present invention provide a sensitive operation verification method, a terminal device, a server, and a verification system. The technical solutions are as follows:

A sensitive operation verification method includes:
scanning, by a first terminal device, a two-dimensional code for initiating a sensitive operation, and obtaining information in the two-dimensional code, the information in the two-dimensional code being at least used to uniquely determine the sensitive operation; and sending, by the first terminal device, a first verification request to a verification server, the first verification request carrying verification information of the first terminal device and the information in the two-dimensional code, so that the verification server performs verification according to the verification information of the first terminal device, the verification information being used to determine user identity information; and allowing, when the verification succeeds and in a state that does not require a user to log in, the sensitive operation that is determined by the information in the two-dimensional code and corresponding to the user identity information to proceed.

A sensitive operation verification method includes:
sending, by a second terminal device, a sensitive operation request to a sensitive operation server, the sensitive operation request at least carrying verification scenario information, so that the sensitive operation server separately sends a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code.

A sensitive operation verification method includes:
receiving, by a sensitive operation server, a sensitive operation request sent by a second terminal device, the sensitive operation request at least carrying verification scenario information; and separately sending, by the sensitive operation server, a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code.

A sensitive operation verification method includes:
receiving, by a verification server, a second verification request sent by a sensitive operation server, the second verification request carrying verification scenario information;

sending, by the verification server, a verification code to the two-dimensional code server, so that the two-dimensional code server generates a two-dimensional code according to the verification scenario information and the verification code, information in the two-dimensional code being at least used to uniquely determine a sensitive operation; and performing, by the verification server after receiving a first verification request that is sent by a first terminal device and carries verification information of the first terminal device and the information in the two-dimensional code, verification according to the verification information of the first terminal device, the verification information being used to determine user identity information; and allowing, when the verification succeeds and in a state that does not require a user to log in, the sensitive operation that is determined by the information in the two-dimensional code and corresponding to the user identity information to proceed.

A terminal device includes:
a scanning module, configured to scan a two-dimensional code for initiating a sensitive operation, and obtain information in the two-dimensional code, the information in the two-dimensional code being at least used to uniquely determine the sensitive operation; and a first verification request module, configured to send a first verification request to a verification server, the first verification request carrying verification information of a local terminal device and the information in the two-dimensional code, so that the verification server performs verification according to the verification information of the local terminal device, the verification information being used to determine user identity information; and allow, when the verification succeeds and in a state that does not require a user to log in, the sensitive operation that is determined by the information in the two-dimensional code and corresponding to the user identity information to proceed.

A terminal device includes:

a sensitive operation request module, configured to send a sensitive operation request to a sensitive operation server, the sensitive operation request at least carrying verification scenario information, so that the sensitive operation server separately sends a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code.

A sensitive operation server includes:

a receiving module, configured to receive a sensitive operation request sent by a second terminal device, the sensitive operation request at least carrying verification scenario information; and a second verification request module, configured to send a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code.

A verification server includes:

a receiving module, configured to receive a second verification request sent by a sensitive operation server, the second verification request carrying verification scenario information;

a verification code sending module, configured to send a verification code to the two-dimensional code server, so that the two-dimensional code server generates a two-dimensional code according to the verification scenario information and the verification code, information in the two-dimensional code being at least used to uniquely determine a sensitive operation; and a verification module, configured to perform, after a first verification request that is sent by a first terminal device and carries verification information of the first terminal device and the information in the two-dimensional code is received, verification according to the verification information of the first terminal device, the verification information being used to determine user identity information; and allow, when the verification succeeds and in a state that does not require a user to log in, the sensitive operation that is determined by the information in the two-dimensional code and corresponding to the user identity information to proceed.

A verification system includes:

a sensitive operation server, configured to receive a sensitive operation request sent by a second terminal device, the sensitive operation request at least carrying verification scenario information; and send a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code;

a verification server, configured to receive a second verification request sent by a sensitive operation server, the second verification request carrying verification scenario information; send a verification code to the two-dimensional code server, so that the two-dimensional code server generates a two-dimensional code according to the verification scenario information and the verification code, information in the two-dimensional code being at least used to uniquely determine a sensitive operation; perform, after receiving a first verification request that is sent by a first terminal device and carries verification information of the first terminal device and the information in the two-dimensional code, verification according to the verification information of the first terminal device, the verification information being used to determine user identity information; and allow, when the verification succeeds and in a state that does not require a user to log in, the sensitive operation that is determined by the information in the two-dimensional code and corresponding to the user identity information to proceed; and a two-dimensional code server, configured to generate a two-dimensional code according to the verification scenario information and the verification code, the information in the two-dimensional code being at least used to uniquely determine the sensitive operation, and provide the two-dimensional code for the first terminal device to scan.

A terminal includes: a touch screen display, one or more processors, a memory, and one or more programs, the one or more programs being stored in the memory, and being configured to be executed by the one or more processors, and the one or more programs containing instructions for performing the following operations:

scanning, by a first terminal device, a two-dimensional code for initiating a sensitive operation, and obtaining information in the two-dimensional code, the information in the two-dimensional code being at least used to uniquely determine the sensitive operation; and sending, by the first terminal device, a first verification request to a verification server, the first verification request carrying verification information of the first terminal device and the information in the two-dimensional code, so that the verification server performs verification according to the verification information of the first terminal device, the verification information being used to determine user identity information; and allowing, when the verification succeeds and in a state that does not require a user to log in, the sensitive operation that is determined by the information in the two-dimensional code and corresponding to the user identity information to proceed.

A terminal includes: a touch screen display, one or more processors, a memory, and one or more programs, the one or more programs being stored in the memory, and being configured to be executed by the one or more processors, and the one or more programs containing an instruction for performing the following operation:

sending, by a second terminal device, a sensitive operation request to a sensitive operation server, the sensitive operation request at least carrying verification scenario information, so that the sensitive operation server separately sends a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code.

A computer readable storage medium stores one or more programs, the one or more programs being used by one or more processors to execute a sensitive operation verification method, and the method including:

scanning, by a first terminal device, a two-dimensional code for initiating a sensitive operation, and obtaining information in the two-dimensional code, the information in the two-dimensional code being at least used to uniquely determine the sensitive operation; and sending, by the first terminal device, a first verification request to a verification server, the first verification request carrying verification information of the first terminal device and the information in the two-dimensional code, so that the verification server performs verification according to the verification information of the first terminal device, the verification information being used to determine user identity information; and allowing, when the verification succeeds and in a state that does not require a user to log in, the sensitive operation that is determined by the information in the two-dimensional code and corresponding to the user identity information to proceed.

A computer readable storage medium stores one or more programs, the one or more programs being used by one or more processors to execute a sensitive operation verification method, and the method including:

sending, by a second terminal device, a sensitive operation request to a sensitive operation server, the sensitive operation request at least carrying verification scenario information, so that the sensitive operation server separately sends a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security and simplifying a sensitive operation process.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Figure 1:
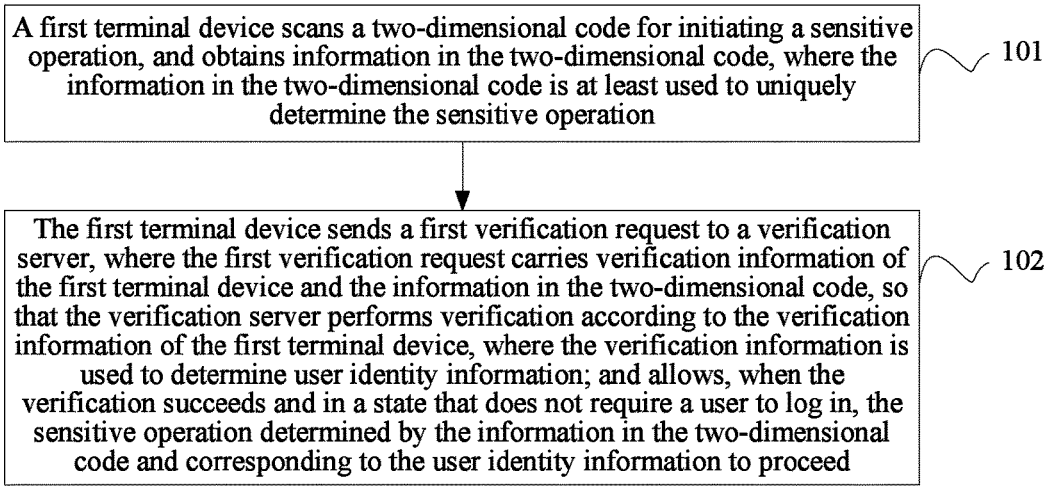
FIG. 1 is a flowchart of a sensitive operation verification method according to an embodiment of the present invention.

A flowchart of a sensitive operation verification method is provided. A terminal device in this embodiment may be a fixed terminal or a mobile terminal. Referring to FIG. 1, the method includes:

101: A first terminal device scans a two-dimensional code for initiating a sensitive operation, and obtains information in the two-dimensional code, where the information in the two-dimensional code is at least used to uniquely determine the sensitive operation.

102: The first terminal device sends a first verification request to a verification server, where the first verification request carries verification information of the first terminal device and the information in the two-dimensional code, so that the verification server performs verification according to the verification information of the first terminal device, where the verification information is used to determine user identity information; and allows, when the verification succeeds and in a state that does not require a user to log in, the sensitive operation that is determined by the information in the two-dimensional code and corresponding to the user identity information to proceed.

Before the scanning, by a first terminal device, a two-dimensional code for initiating a sensitive operation, the method further includes:

registering the user identity information and the verification information of the first terminal device, and determining a binding relationship between the user identity information and the verification information.

The verification information of the first terminal device includes at least one of the following items: a user identifier, an identifier of the first terminal device, and an application identifier of the first terminal device.

The two-dimensional code is provided by a second terminal device that initiates the sensitive operation.

The information in the two-dimensional code includes at least one of the following items: organization information, service identification information, verification scenario information, and two-dimensional code identification information.

The information in the two-dimensional code further includes a URL link relevant or irrelevant to verification of the sensitive operation.

After the sending, by the first terminal device, a first verification request to a verification server, the method further includes:

receiving, by the first terminal device, a verification result returned by the verification server, and displaying a processing result of the sensitive operation on the first terminal device and/or the second terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 2:
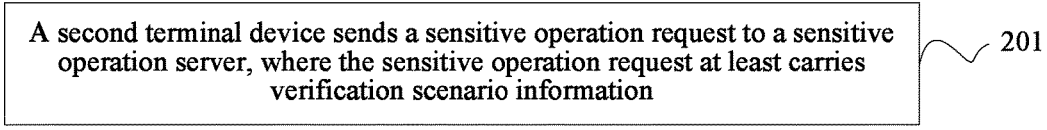
FIG. 2 is a flowchart of another sensitive operation verification method according to an embodiment of the present invention.

FIG. 2 is a flowchart of a sensitive operation verification method according to an embodiment of the present invention. A terminal device in this embodiment may be a fixed terminal or a mobile terminal. Referring to FIG. 2, the method includes:

201: A second terminal device sends a sensitive operation request to a sensitive operation server, where the sensitive operation request at least carries verification scenario information, so that the sensitive operation server separately sends a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code.

The sensitive operation request further carries organization information and service identification information.

The information in the two-dimensional code includes at least one of the following items: organization information, service identification information, verification scenario information, and two-dimensional code identification information.

The information in the two-dimensional code includes a URL link relevant or irrelevant to verification of the sensitive operation.

After the sending, by a second terminal device, a sensitive operation request to a sensitive operation server, the method further includes:

receiving, by the second terminal device, a verification result returned by the verification server, and displaying a processing result of the sensitive operation on the first terminal device and/or the second terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 3:
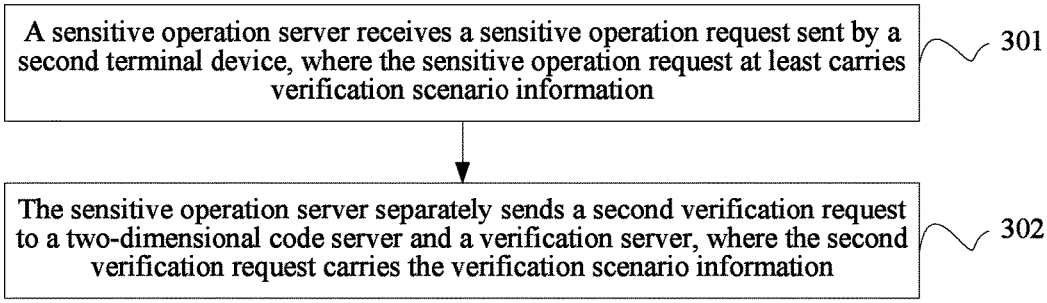
FIG. 3 is a flowchart of another sensitive operation verification method according to an embodiment of the present invention.

FIG. 3 is a flowchart of a sensitive operation verification method according to an embodiment of the present invention. This embodiment is executed by a sensitive operation server. Referring to FIG. 3, the method includes:

301: The sensitive operation server receives a sensitive operation request sent by a second terminal device, where the sensitive operation request at least carries verification scenario information.

302: The sensitive operation server separately sends a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code.

The sensitive operation request further carries organization information and/or service identification information.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 4:
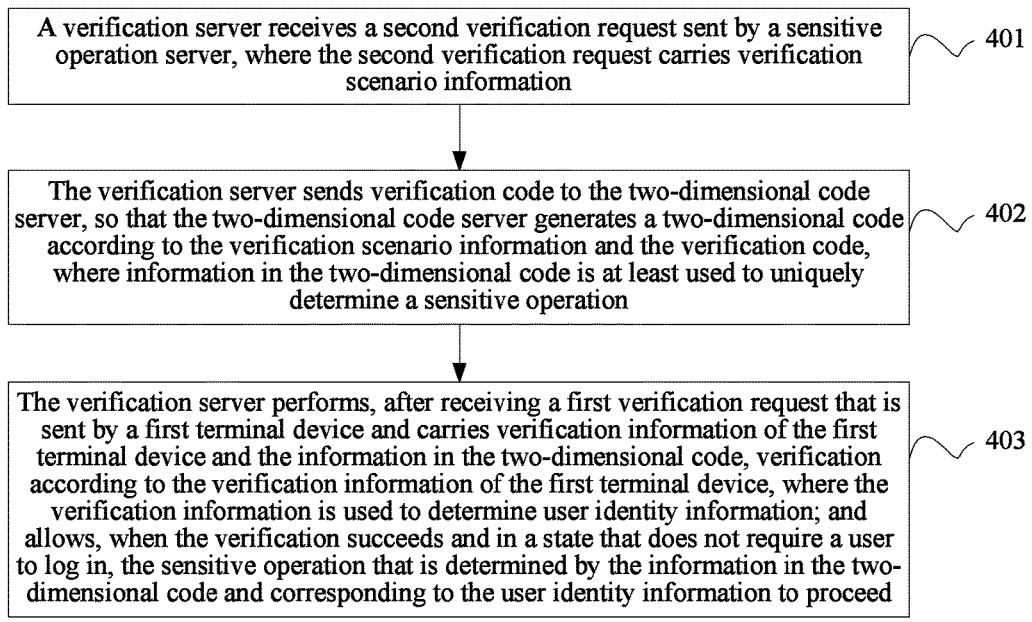
FIG. 4 is a flowchart of another sensitive operation verification method according to an embodiment of the present invention.

FIG. 4 is a flowchart of a sensitive operation verification method according to an embodiment of the present invention. This embodiment is executed by a verification server. Referring to FIG. 4, the method includes:

401: The verification server receives a second verification request sent by a sensitive operation server, where the second verification request carries verification scenario information.

402: The verification server sends a verification code to the two-dimensional code server, so that the two-dimensional code server generates a two-dimensional code according to the verification scenario information and the verification code, where information in the two-dimensional code is at least used to uniquely determine the sensitive operation.

403: The verification server performs, after receiving a first verification request that is sent by a first terminal device and carries verification information of the first terminal device and the information in the two-dimensional code, verification according to the verification information of the first terminal device, where the verification information is used to determine user identity information; and allows, when the verification succeeds and in a state that does not require a user to log in, the sensitive operation that is determined by the information in the two-dimensional code and corresponding to the user identity information to proceed.

Before the receiving, by a verification server, a second verification request sent by a sensitive operation server, the method further includes:

registering the user identity information and the verification information of the first terminal device, and determining a binding relationship between the user identity information and the verification information.

The information in the two-dimensional code includes at least one of the following items: organization information, service identification information, verification scenario information, and two-dimensional code identification information.

The information in the two-dimensional code includes a URL link relevant or irrelevant to verification of the sensitive operation.

After the performing, by the verification server, verification according to the verification information of the first terminal device, the method includes:

separately sending a verification result to the first terminal device and/or a second terminal device that initiates the sensitive operation, so that the first terminal device and the second terminal device that initiates the sensitive operation display a processing result of the sensitive operation according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 5:
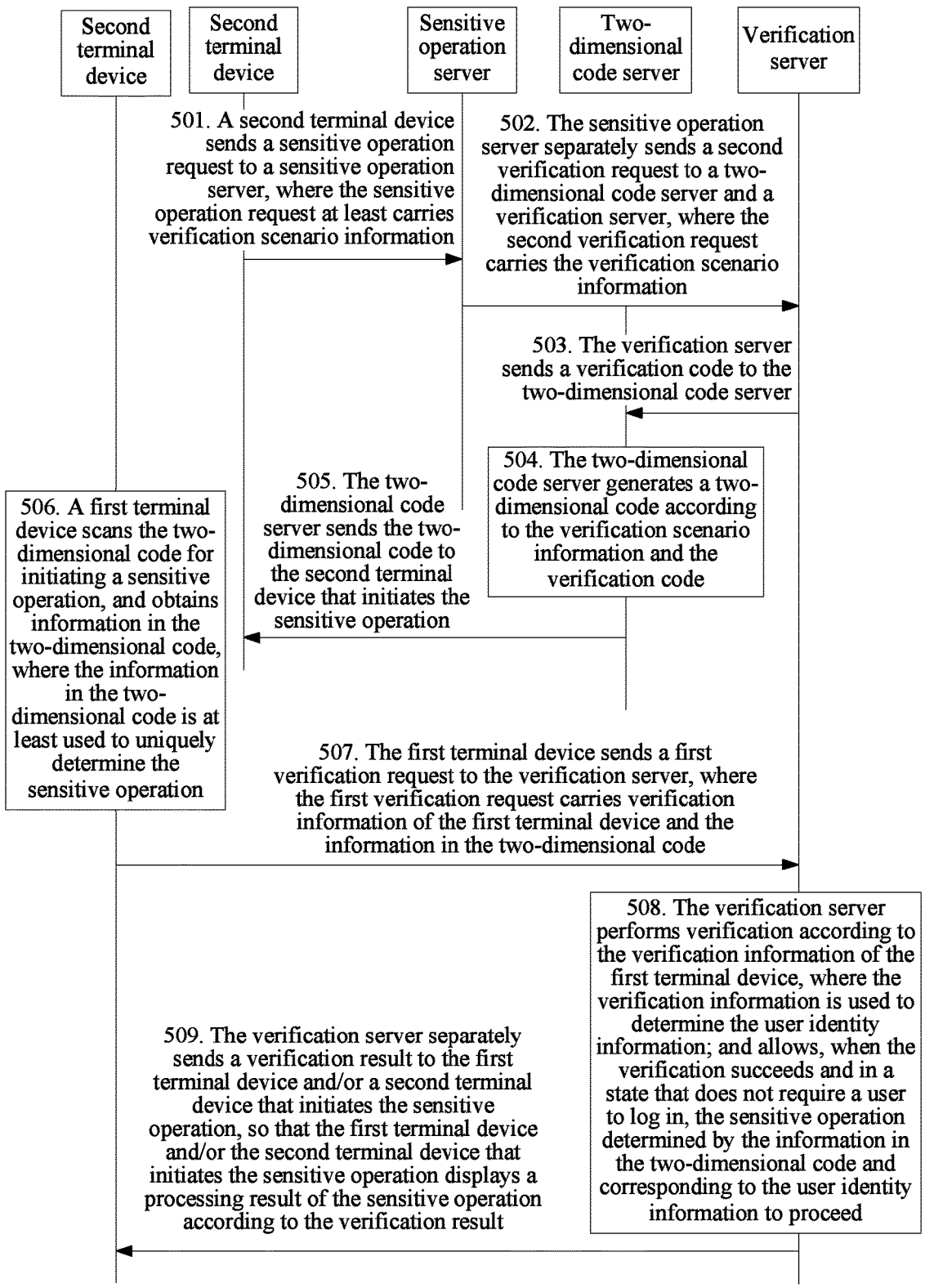
FIG. 5 is a flowchart of another sensitive operation verification method according to an embodiment of the present invention.

FIG. 5 is a flowchart of a sensitive operation verification method according to an embodiment of the present invention. In this embodiment, interaction is performed among a first terminal device, a second terminal device, a sensitive operation server, a two-dimensional code server, and a verification server. Referring to FIG. 5, this embodiment specifically includes:

501: A second terminal device sends a sensitive operation request to a sensitive operation server, where the sensitive operation request at least carries verification scenario information.

The sensitive operation mainly refers to an operation that relates to information such as privacy or an account and is performed by a user corresponding to the second terminal device. The operation affects an operation scenario in which important information of a user such as security, privacy, property, or rights is changed, for example, online bank remittance, game equipment transfer, password change, or security tool change, which is not limited in this embodiment of the present invention. For example, in a scenario of online bank transfer, the sensitive operation refers to transfer, and the first terminal device may scan a two-dimensional code to verify the sensitive operation to implement the transfer. For another example, in a scenario of website login, the sensitive operation refers to user login, and the first terminal device may scan a two-dimensional code that is displayed on a website to which a user logs in (without a need to enter a password or a verification code) on a computer, to implement the user login. For still another example, in a scenario of shopping (including a virtual item or a physical item), the shopping may be implemented by scanning a two-dimensional code of a promotion advertiser.

For sensitive operations, when types of the sensitive operations are different, specific verification scenario information of the sensitive operations is also different.

The verification scenario information refers to information relevant to the sensitive operation, for example, a source of the sensitive operation, such as a website, and specific content of the sensitive operation, such as payment. Details are not described herein.

Further, the sensitive operation request may further carry service identification information in addition to the verification scenario information. The service identification information is used to differentiate service scenarios. Service identification information of different service scenarios is also different, and each piece of the service identification information may be used to uniquely identify a corresponding service scenario. However, for different service identification information, the sensitive operation server may send verification requests to different verification servers according to service identification information carried in the sensitive operation request. Certainly, in a case in which a verification system includes only one verification server, the sensitive operation server sends a verification request to the verification server, so that the verification server delivers a verification code according to the service identification information.

Furthermore, the sensitive operation request may further carry organization information in addition to the verification scenario information, where the organization information may be used to uniquely identify an operator that provides the sensitive operation. For example, in a scenario of online bank transfer, organization information in this scenario is used to uniquely identify a bank that performs a transfer operation. In a scenario of website login, organization information in this scenario is used to uniquely identify an operator of this website.

502: The sensitive operation server separately sends a second verification request to a two-dimensional code server and a verification server, where the second verification request carries the verification scenario information.

The two-dimensional code server is a server that can generate a two-dimensional code according to the verification scenario information, and the verification server is a server that is configured to deliver a verification code, and perform verification according to received information and the delivered verification code.

503: The verification server receives the second verification request, and sends a verification code to the two-dimensional code server.

After receiving the second verification request, the verification server sends the verification code to the two-dimensional code server. It should be noted that, the verification server may randomly generate a verification code, such as a random code, or may generate a verification code according to the verification scenario information carried in the received second verification request, such as an encrypted string, which is not specifically limited in this embodiment.

Further, when the verification system includes multiple service servers that serve different services, each service server may be uniquely identified by the service identification information. Therefore, step 503 may also be replaced with the following step: sending, by the verification server according to service identification information carried in the second verification request, a verification code to a service server corresponding to the service identification information, and sending, by the service server, the verification code to the two-dimensional code server.

504: The two-dimensional code server generates a two-dimensional code according to the verification scenario information and the verification code, where information in the two-dimensional code is at least used to uniquely determine the sensitive operation.

The information in the two-dimensional code includes at least one of the following items: organization information, service identification information, verification scenario information, two-dimensional code identification information, and a verification code. The information that is specifically included in the information in the two-dimensional code corresponds to the information carried in the second verification request. When the second verification request carries only the verification scenario information, information in the generated two-dimensional code includes a verification code, verification scenario information, and two-dimensional code identification information; and when the second verification request further carries the organization information and/or the service identification information, the information in the generated two-dimensional code includes a verification code, organization information and/or service identification information, verification scenario information, and two-dimensional code identification information. The two-dimensional code identification information may be used to identify the two-dimensional code server, so that the two-dimensional code server is also verified in a subsequent verification process.

A two-dimensional code, also referred to as a two-dimensional barcode, records data symbol information by using a black-and-white pattern in which specific geometric patterns of a certain type are distributed on a plane (in a two-dimensional direction) according to a certain rule; and in coding, skillfully utilizes a concept of "0" and "1" bitstreams that constitute an internal logic basis of a computer, represents text and numerical value information by using several geometric forms corresponding to a binary system, and implements information automatic processing through automatic reading by using an image input device or a photoelectric scanning device. Some commonalities exist between the two-dimensional code and a bar code technology, which are as follows: each code system has its given character set; each character occupies a certain width; it has a certain check function, and so on. In addition, the two-dimensional code further has a function of automatically identifying information in different lines, and a characteristic such as rotating and changing a processed pattern.

Further, the information in the two-dimensional code includes a URL link relevant or irrelevant to verification of the sensitive operation. The URL link may be used to provide functions such as downloading and information querying for a user. The URL link may be carried in the second verification request, and after receiving the second verification request, the two-dimensional code server generates a two-dimensional code according to the URL link and other information; or the URL link may be added by the two-dimensional code server according to server settings. Information about the URL link is extended information, and therefore may be not encrypted.

It is easy to establish and implement a two-dimensional code platform. Therefore, compared with a complex process such as short message service message verification, verification with the two-dimensional code not only simplifies operation steps, but also saves the costs and further improves security.

505: The two-dimensional code server sends the two-dimensional code to the second terminal device that initiates the sensitive operation.

The scenario of shopping shown in step 501 is used as an example. After the user corresponding to the second terminal device selects a relevant item from a webpage and chooses to pay, a sensitive operation request is initiated. The two-dimensional code server sends a generated two-dimensional code to the second terminal device, and the second terminal device displays the two-dimensional code (the two-dimensional code pops up after a verification box in a payment verification link is pulled).

506: A first terminal device scans the two-dimensional code for initiating a sensitive operation, and obtains information in the two-dimensional code, where the information in the two-dimensional code is at least used to uniquely determine the sensitive operation.

In this embodiment, an application program used for the sensitive operation may be installed on the first terminal device, where the application program has a unique application identifier, which may also be referred to as a number, and an application identifier of an application program installed on a terminal device corresponding to each user is different. For application programs installed by users, each user has a unique user identifier such as a user name, and for the terminal device on which the application program is installed, the terminal device also has a unique device identifier, such as a serial number of a mobile phone or a mobile phone number. A user corresponding to the terminal device has been registered by using the application program. Therefore, after running the application program and scanning the two-dimensional code, the first terminal device can obtain a verification code and verification scenario information in the two-dimensional code. Further, the first terminal device may provide the obtained verification scenario information for the user corresponding to the first terminal device, to prompt the user whether to perform the sensitive operation. When the user chooses to perform the sensitive operation, step 507 is performed, and if the user chooses not to perform the sensitive operation, the process ends.

For the first terminal device, when running the application program for the first time, the first terminal device registers user identity information and the verification information of the first terminal device in a manner such as a short message service message or a static password, so as to determine a binding relationship between the user identity information and the verification information, where the binding relationship may be stored in a database, and read by a server that participates in the sensitive operation, or servers, such as the verification server, that participate in the sensitive operation may be notified of the binding relationship.

For example, during online shopping, when visiting a website for the first time, a user A needs to register with the website according to user identity information, that is, enter information about the user, such as an email address, a mobile phone number, an address, a user name, and a password, download and install an application program provided by the website, and open the application program to perform an operation. After the operation is completed, the server obtains the user identity information, and binds a user identifier corresponding to the terminal device on which the application program is installed to the user identity information. During shopping, the user only needs to open the application program; and then the application program obtains information in the two-dimensional code, and further performs verification according to the information in the two-dimensional code.

A person skilled in the art may learn that, terminal devices generally have a capability to scan a two-dimensional code and obtain information carried in the two-dimensional code from the two-dimensional code.

In this embodiment of the present invention, description is only provided by using an example in which a terminal device that initiates the sensitive operation and a terminal device that scans the two-dimensional code are different terminal devices. However, in an actual application, the terminal device that initiates the sensitive operation and the terminal device that scans the two-dimensional code may also be a same terminal device, and during scanning, scanning may be performed by using a camera on a handheld device connected to the terminal device, or a picture may be scanned to the local, and then stored and read.

The first terminal device should have a display function and a scan function. Preferably, the application program installed on the first terminal device should have the scan function, so as to scan the obtained two-dimensional code.

It should be noted that, the two-dimensional code may be provided for the second terminal device via a network, displayed on a webpage that is opened on the second terminal device, and then presented to the user, so that the user performs scanning by using the terminal device or the application program.

507: The first terminal device sends a first verification request to the verification server, where the first verification request carries verification information of the first terminal device and the information in the two-dimensional code.

The verification information of the first terminal device includes at least one of the following items: a user identifier, an identifier of the first terminal device, and an application identifier of the first terminal device.

The application program has been installed on the first terminal device, that is, a user identifier of the first terminal device, an identifier of the first terminal device, and an application identifier of the first terminal device all have been determined. To determine an identity of the user in a subsequent verification process, the first verification request needs to carry the user identifier of the first terminal device, the identifier of the first terminal device, and the application identifier of the first terminal device, so that the verification server can verify the first terminal device according to the user identifier, the identifier of the first terminal device, and the application identifier of the first terminal device.

Further, the first verification request sent by the first terminal device may also carry application program information, including application program installation information, an application program record, and the like, to increase a dimension of the verification.

The user identity information in this embodiment includes but is not limited to a user name, a user attribute, an operation record, and the like. The application program information includes but is not limited to application program code, an installation time, an application program record, and the like.

508: The verification server performs verification according to the verification information of the first terminal device, where the verification information is used to determine the user identity information; and allows, when the verification succeeds and in a state that does not require a user to log in, the sensitive operation that is determined by the information in the two-dimensional code and corresponding to the user identity information to proceed.

The user identity information bound to the verification information of the first terminal device may be learned according to the verification information of the first terminal device, and the sensitive operation may be uniquely determined according to the information in the two-dimensional code. Therefore, when the verification succeeds, the sensitive operation that is determined by the information in the two-dimensional code and corresponding to the user identity information may be allowed to proceed in a state that does not require a user to log in.

The verification server receives the first verification request sent by the first terminal device, verifies identity information of the first terminal device according to the verification information of the first terminal device carried in the first verification request, and verifies each item in the information in the two-dimensional code. If any item is verified to be incorrect, the verification on the first terminal device fails. When verification on all items succeeds, the verification on the first terminal device succeeds, and the sensitive operation is allowed to proceed, such as a payment or a password change. It should be noted that, the verification server may be a functional module on a server that performs the sensitive operation, or may also be a server that is independent of the server that performs the sensitive operation.

When the first verification request sent by the first terminal device further carries the application program information, the verification is further performed according to this application program information and application program information that is stored in the verification server.

Based on the scenario of shopping shown in step 501, a payment operation may be completed simply by scanning the two-dimensional code with a device such as a mobile phone or a mobile terminal (for example, scanning the two-dimensional code by using a mobile phone on which an app (Application, a third party application program) is installed), or another registered user may scan the two-dimensional code with his/her mobile phone, to complete entrusted payment.

509: The verification server separately sends a verification result to the first terminal device and/or a second terminal device that initiates the sensitive operation, so that the first terminal device and/or the second terminal device that initiates the sensitive operation displays a processing result of the sensitive operation according to the verification result.

Further, the first terminal device receives a verification result returned by the verification server, and displays a processing result of the sensitive operation on the first terminal device according to the verification result.

Further, the second terminal device receives a verification result returned by the verification server, and displays a processing result of the sensitive operation on the second terminal device according to the verification result.

Furthermore, the first terminal device and/or the second terminal device stores the processing result, so that a history operation may be queries subsequently according to specific content or a keyword of the sensitive operation.

Notifying the user of a performed operation and an operation result on two interfaces of the second terminal device (such as a computer) that initiates the sensitive operation and the first terminal device (such as a mobile phone or a PAD) that confirms the sensitive operation may effectively prevent "phishing".

After completing the verification, the verification server feeds back a verification result to user operation interfaces of both the first terminal device on which the application program is installed and the second terminal device, and the application program records the verification result. Further, during feedback, the service scenario may also be fed back, so that the application program records the service scenario. The first terminal device and the second terminal device may display prompt information on the user operation interfaces, so that the user learns whether the sensitive operation fails.

Further, after receiving the verification result and performing the sensitive operation according to the verification result, the terminal device may further send an instruction such as a delivery instruction to a website server that the current operation involves, where the instruction carries a user identifier, so that the website server can perform, after receiving the instruction, an operation according to the user identifier carried in the instruction. For example, for the delivery instruction, the website server can obtain, after receiving the delivery instruction, address information in user identity information in a user identifier according to the user identifier carried in the instruction, to perform a delivery.

It should be noted that, the servers described in the foregoing embodiment, including the sensitive operation server, the two-dimensional code server, and the verification server, may all be independent servers, may also be different functional modules of a same server, or certainly may also be servers in a server cluster that are responsible for achieving different functions.

To further show advantages of this embodiment of the present invention in comparison with the existing technology, description is provided by using an example in which a user does shopping on an online shopping website.

Current shopping steps include: 1. the user opens a webpage; 2. log in to Taobao; 3. select a commodity; 4. confirm a payment; 5. verify the payment; and 6. confirm that the purchase succeeds. When the embodiments of the present invention are used, only the following steps are needed: 1. open a webpage (in some cases, it is not required to open a webpage, and this step may be omitted); 2. select a commodity; 3. scan a two-dimensional code to pay; and 4. confirm that the purchase succeeds. It can be seen from the foregoing comparison that, compared with the current shopping steps, this embodiment of the present invention saves nearly 50% of the steps.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 6:
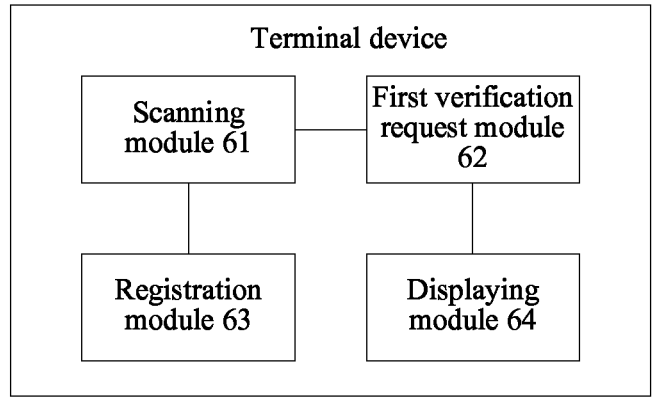
FIG. 6 is a schematic structural diagram of a terminal device according to an embodiment of the present invention.

FIG. 6 is a schematic structural diagram of a terminal device according to the present disclosure. Referring to FIG. 6, the terminal device includes:

a scanning module 61, configured to scan a two-dimensional code for initiating a sensitive operation, and obtain information in the two-dimensional code, where the information in the two-dimensional code is at least used to uniquely determine the sensitive operation; and a first verification request module 62, configured to send a first verification request to a verification server, where the first verification request carries verification information of a local terminal device and the information in the two-dimensional code, so that the verification server performs verification according to the verification information of the local terminal device, where the verification information is used to determine user identity information; and allow, when the verification succeeds and in a state that does not require a user to log in, the sensitive operation that is determined by the information in the two-dimensional code and corresponding to the user identity information to proceed.

The terminal device further includes:

a registration module 63, configured to register the user identity information and the verification information of the local terminal device, and determine a binding relationship between the user identity information and the verification information.

The verification information of the local terminal device includes at least one of the following items: a user identifier, an identifier of the local terminal device, and an application identifier of the local terminal device.

The two-dimensional code is provided by a second terminal device that initiates the sensitive operation.

The information in the two-dimensional code includes at least one of the following items: organization information, service identification information, verification scenario information, and two-dimensional code identification information.

The information in the two-dimensional code further includes a URL link relevant or irrelevant to verification of the sensitive operation.

The terminal device further includes:

a display module 64, configured to receive a verification result returned by the verification server, and display a processing result of the sensitive operation on the local terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 7:
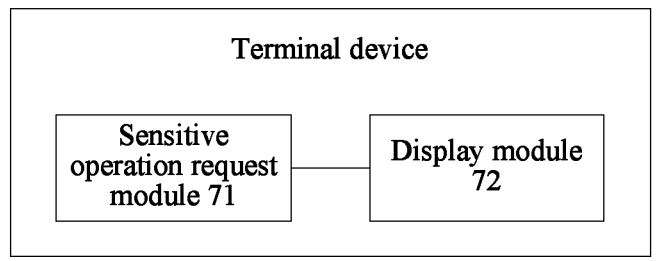
FIG. 7 is a schematic structural diagram of another terminal device according to an embodiment of the present invention.

FIG. 7 is a schematic structural diagram of a terminal device according to the present disclosure. Referring to FIG. 7, the terminal device includes:

a sensitive operation request module 71, configured to send a sensitive operation request to a sensitive operation server, where the sensitive operation request at least carries verification scenario information, so that the sensitive operation server separately sends a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code.

The sensitive operation request further carries organization information and service identification information.

The information in the two-dimensional code includes at least one of the following items: organization information, service identification information, verification scenario information, and two-dimensional code identification information.

The information in the two-dimensional code further includes a URL link relevant or irrelevant to verification of the sensitive operation.

The terminal device further includes:

a display module 72, configured to receive a verification result returned by the verification server, and display a processing result of the sensitive operation according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 8:
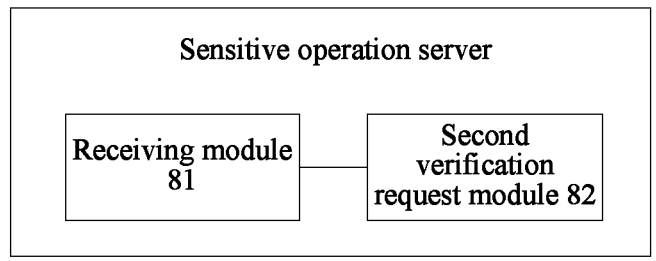
FIG. 8 is a schematic structural diagram of a sensitive operation server according to an embodiment of the present invention.

FIG. 8 is a schematic structural diagram of a sensitive operation server according to the present disclosure. Referring to FIG. 8, the sensitive operation server includes:

a receiving module 81, configured to receive a sensitive operation request sent by a second terminal device, where the sensitive operation request at least carries verification scenario information; and a second verification request module 82, configured to send a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code.

The sensitive operation request further carries organization information and/or service identification information.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 9:
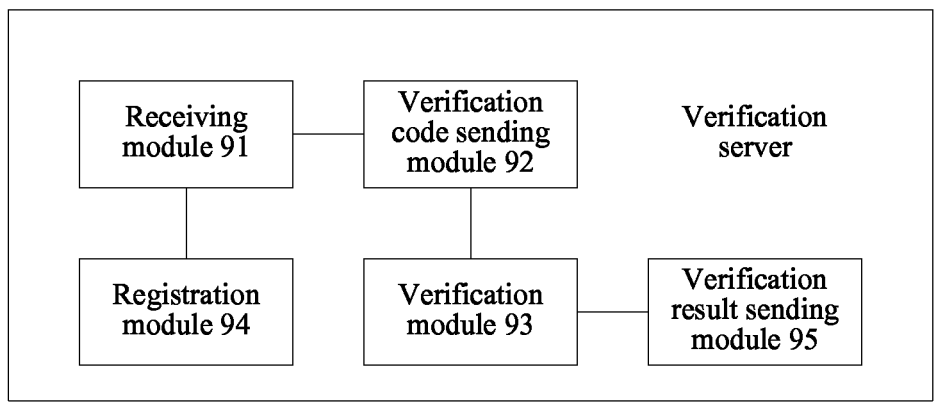
FIG. 9 is a schematic structural diagram of a verification server according to an embodiment of the present invention.

FIG. 9 is a schematic structural diagram of a verification server according to the present disclosure. Referring to FIG. 9, the verification server includes:

a receiving module 91, configured to receive a second verification request sent by a sensitive operation server, where the second verification request carries verification scenario information;

a verification code sending module 92, configured to send a verification code to the two-dimensional code server, so that the two-dimensional code server generates a two-dimensional code according to the verification scenario information and the verification code, where information in the two-dimensional code is at least used to uniquely determine the sensitive operation; and a verification module 93, configured to perform, after a first verification request that is sent by a first terminal device and carries verification information of the first terminal device and the information in the two-dimensional code is received, verification according to the verification information of the first terminal device, where the verification information is used to determine user identity information; and allow, when the verification succeeds and in a state that does not require a user to log in, the sensitive operation that is determined by the information in the two-dimensional code and corresponding to the user identity information to proceed.

The verification server further includes:

a registration module 94, configured to register the user identity information and the verification information of the first terminal device, and determine a binding relationship between the user identity information and the verification information.

The information in the two-dimensional code includes at least one of the following items: organization information, service identification information, verification scenario information, and two-dimensional code identification information.

The information in the two-dimensional code further includes a URL link relevant or irrelevant to verification of the sensitive operation.

The verification server further includes:

a verification result sending module 95, configured to separately send a verification result to the first terminal device and/or a second terminal device that initiates the sensitive operation, so that the first terminal device and the second terminal device that initiates the sensitive operation display a processing result of the sensitive operation according to the verification result.

Implementation mechanisms for the terminal devices and servers in this embodiment are the same as those for the foregoing relevant method embodiments. For details, reference may be made to descriptions in the foregoing relevant method embodiments, and the details are not described again herein.

It should be noted that the above functional modules are only described for exemplary purposes for the servers and terminal devices that are provided in the foregoing embodiments. In actual applications, the functions may be allocated to different functional modules according to specific needs, which means that the internal structure of the apparatus is divided to different functional modules to complete all or some of the above described functions. In addition, the apparatuses for triggering an intelligent network service provided in the foregoing embodiments are based on the same concept as the methods for triggering an intelligent network service in the foregoing embodiments. For the specific implementation process, refer to the method embodiments, and the details are not described herein again.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 10:
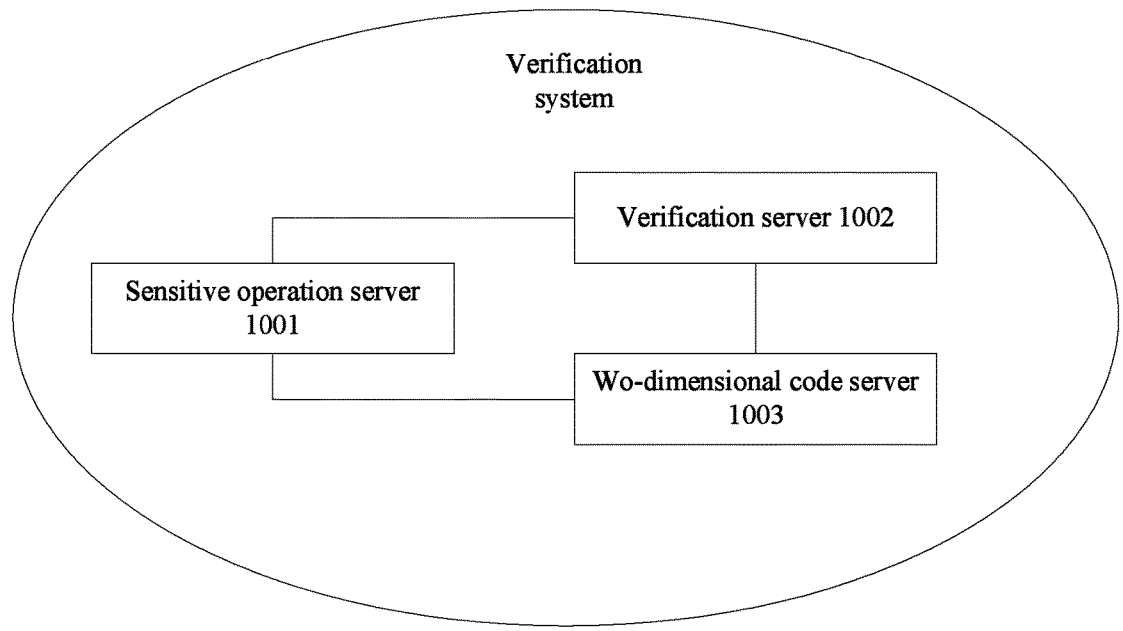
FIG. 10 is a schematic structural diagram of a verification system according to an embodiment of the present invention.

FIG. 10 is a schematic structural diagram of a verification system according to the present disclosure. Referring to FIG. 10, the verification system includes:

a sensitive operation server 1001, configured to receive a sensitive operation request sent by a second terminal device, where the sensitive operation request at least carries verification scenario information; and send a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code;

a verification server 1002, configured to receive a second verification request sent by a sensitive operation server, where the second verification request carries verification scenario information; send a verification code to the two-dimensional code server, so that the two-dimensional code server generates a two-dimensional code according to the verification scenario information and the verification code, where information in the two-dimensional code is at least used to uniquely determine a sensitive operation; perform, after receiving a first verification request that is sent by a first terminal device and carries verification information of the first terminal device and the information in the two-dimensional code, verification according to the verification information of the first terminal device, where the verification information is used to determine user identity information; and allow, when the verification succeeds and in a state that does not require a user to log in, the sensitive operation that is determined by the information in the two-dimensional code and corresponding to the user identity information to proceed; and a two-dimensional code server 1003, configured to generate a two-dimensional code according to the verification scenario information and the verification code, where the information in the two-dimensional code is at least used to uniquely determine the sensitive operation, and provide the two-dimensional code for the first terminal device to scan.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Figure 11:
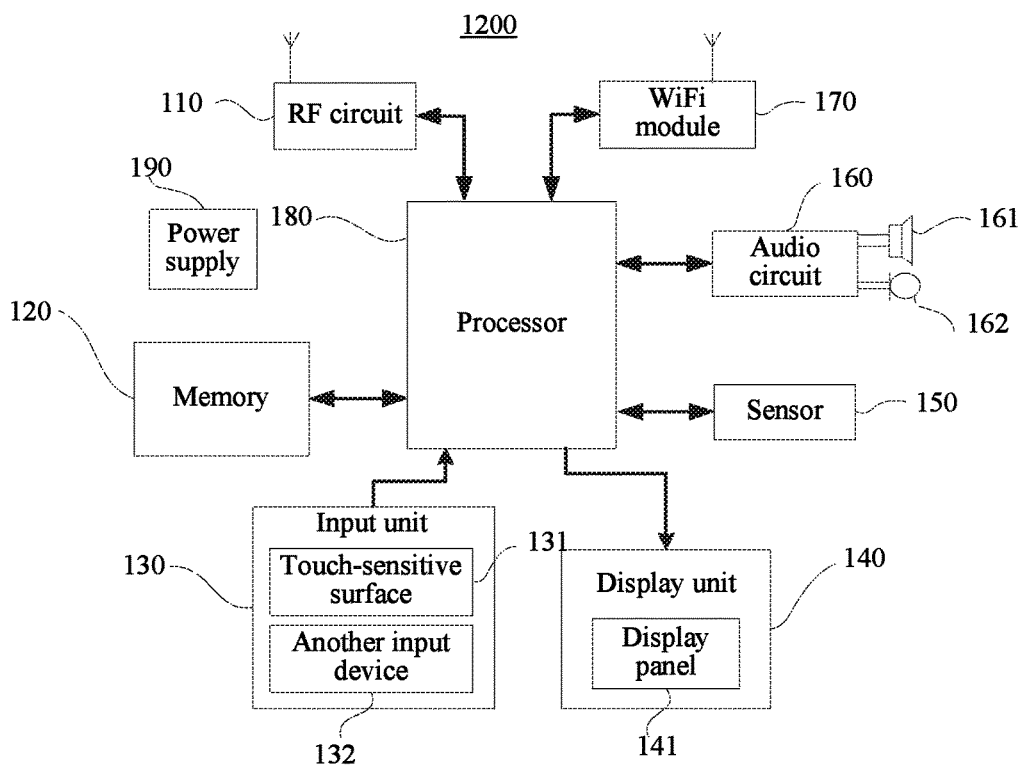
FIG. 11 is a schematic structural diagram of another terminal device according to an embodiment of the present invention.

Referring to FIG. 11, FIG. 11 shows a schematic structural diagram of a terminal having a touch-sensitive surface according to an embodiment of the present invention. The terminal may be configured to implement the sensitive operation verification method provided in the foregoing embodiment, which is specifically as follows:

A terminal 1200 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art can understand that, a structure of the terminal shown in FIG. 11 does not constitute a limitation on the terminal, and may include components that are more or fewer than those shown in FIG. 11, or some components may be combined, or a different component deployment may be used, where:

the RF circuit 110 may be configured to receive and send signals during an information receiving and sending process or a call process, and particularly, after receiving downlink information from a base station, deliver the information to one or more processors 180 for processing, and send related uplink data to the base station; generally, the RF circuit 110 includes but is not limited to an antenna, at least one amplifier, a tuner, one or more oscillators, a subscriber identity module (SIM) card, a transceiver, a coupler, a low noise amplifier (LNA), and a duplexer; in addition, the RF circuit 110 may also communicate with a network and another device by wireless communication. The wireless communication may use any communications standard or protocol, which includes, but is not limited to, Global System of Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, for example, at least one magnetic disk storage device, a flash memory, or another volatile solid-state storage device. Accordingly, the memory 120 may further include a memory controller, so as to provide access of the processor 180 and the input unit 130 to the memory 120.

The input unit 130 may be configured to receive inputted digit or character information, and generate a keyboard, mouse, joystick, optical, or trackball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a function key (such as a volume control key or a switch key), a track ball, a mouse, and a joystick.

The display unit 140 may be configured to display information input by the user or information provided for the user, and various graphical user interfaces of the terminal device 1200. The graphical user interfaces may be formed by a graph, a text, an icon, a video, or any combination thereof. The display unit 140 may include a display panel 141, and optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 11, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 1200 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1200, are not further described herein.

The audio circuit 160, a loudspeaker 161, and a microphone 162 may provide audio interfaces between the user and the terminal 1200. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

WiFi is a short distance wireless transmission technology. The terminal 1200 may help, by using the WiFi module 170, the user to receive and send e-mails, browse a webpage, access streaming media, and so on, which provides wireless broadband Internet access for the user. Although FIG. 11 shows the WiFi module 170, it may be understood that, the WiFi module 170 is not a necessary component of the terminal 1200, and when required, the WiFi module 170 may be omitted as long as the scope of the essence of the present disclosure is not changed.

The processor 180 is the control center of the terminal 1200, and is connected to various parts of the mobile phone by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It can be understood that, the foregoing modem may also not be integrated into the processor 180.

The terminal 1200 further includes the power supply 190 (for example, a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1200 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and are configured to be executed by the one or more processors. The one or more programs contain instructions for performing the following operations:

scanning, by a first terminal device, a two-dimensional code for initiating a sensitive operation, and obtaining information in the two-dimensional code, where the information in the two-dimensional code is at least used to uniquely determine the sensitive operation; and sending, by the first terminal device, a first verification request to a verification server, where the first verification request carries verification information of the first terminal device and the information in the two-dimensional code, so that the verification server performs verification according to the verification information of the first terminal device, where the verification information is used to determine user identity information; and allowing, when the verification succeeds and in a state that does not require a user to log in, the sensitive operation that is determined by the information in the two-dimensional code and corresponding to the user identity information to proceed.

It is assumed that the foregoing description is a first possible implementation manner, and then in a second possible implementation manner that is provided on the basis of the first possible implementation manner, the memory of the terminal further includes an instruction for performing the following operation:

registering the user identity information and the verification information of the first terminal device, and determining a binding relationship between the user identity information and the verification information.

In a third possible implementation manner that is provided on the basis of the first or second possible implementation manner, the verification information of the first terminal device includes at least one of the following items: a user identifier, an identifier of the first terminal device, and an application identifier of the first terminal device.

In a fourth possible implementation manner that is provided on the basis of the first possible implementation manner, the two-dimensional code is provided by a second terminal device that initiates the sensitive operation.

In a fifth possible implementation manner that is provided on the basis of the first possible implementation manner, the information in the two-dimensional code includes at least one of the following items: organization information, service identification information, verification scenario information, and two-dimensional code identification information.

In a sixth possible implementation manner that is provided on the basis of the first or fifth possible implementation manner, the information in the two-dimensional code further includes a URL link relevant or irrelevant to verification of the sensitive operation.

In a seventh possible implementation manner that is provided on the basis of the first or fourth possible implementation manner, the memory of the terminal further includes an instruction for performing the following operation:

receiving, by the first terminal device, a verification result returned by the verification server, and displaying a processing result of the sensitive operation on the first terminal device and/or the second terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

Referring to FIG. 11, FIG. 11 shows a schematic structural diagram of a terminal having a touch-sensitive surface according to an embodiment of the present invention. The terminal may be configured to implement the sensitive operation verification method provided in the foregoing embodiment, which is specifically as follows:

A terminal 1200 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art can understand that, a structure of the terminal shown in FIG. 11 does not constitute a limitation on the terminal, and may include components that are more or fewer than those shown in FIG. 11, or some components may be combined, or a different component deployment may be used, where:

the RF circuit 110 may be configured to receive and send signals during an information receiving and sending process or a call process, and particularly, after receiving downlink information from a base station, deliver the information to one or more processors 180 for processing, and send related uplink data to the base station; generally, the RF circuit 110 includes but is not limited to an antenna, at least one amplifier, a tuner, one or more oscillators, a subscriber identity module (SIM) card, a transceiver, a coupler, a low noise amplifier (LNA), and a duplexer; in addition, the RF circuit 110 may also communicate with a network and another device by wireless communication. The wireless communication may use any communications standard or protocol, which includes, but is not limited to, Global System of Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, for example, at least one magnetic disk storage device, a flash memory, or another volatile solid-state storage device. Accordingly, the memory 120 may further include a memory controller, so as to provide access of the processor 180 and the input unit 130 to the memory 120.

The input unit 130 may be configured to receive inputted digit or character information, and generate a keyboard, mouse, joystick, optical, or trackball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a function key (such as a volume control key or a switch key), a track ball, a mouse, and a joystick.

The display unit 140 may be configured to display information input by the user or information provided for the user, and various graphical user interfaces of the terminal device 1200. The graphical user interfaces may be formed by a graph, a text, an icon, a video, or any combination thereof. The display unit 140 may include a display panel 141, and optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 11, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 1200 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1200, are not further described herein.

The audio circuit 160, a loudspeaker 161, and a microphone 162 may provide audio interfaces between the user and the terminal 1200. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

WiFi is a short distance wireless transmission technology. The terminal 1200 may help, by using the WiFi module 170, the user to receive and send e-mails, browse a webpage, access streaming media, and so on, which provides wireless broadband Internet access for the user. Although FIG. 11 shows the WiFi module 170, it may be understood that, the WiFi module 170 is not a necessary component of the terminal 1200, and when required, the WiFi module 170 may be omitted as long as the scope of the essence of the present disclosure is not changed.

The processor 180 is the control center of the terminal 1200, and is connected to various parts of the mobile phone by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It can be understood that, the foregoing modem may also not be integrated into the processor 180.

The terminal 1200 further includes the power supply 190 (for example, a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1200 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and are configured to be executed by the one or more processors. The one or more programs contain an instruction for performing the following operation:

sending, by a second terminal device, a sensitive operation request to a sensitive operation server, where the sensitive operation request at least carries verification scenario information, so that the sensitive operation server separately sends a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code.

It is assumed that the foregoing description is a first possible implementation manner, and then in a second possible implementation manner that is provided on the basis of the first possible implementation manner, the sensitive operation request further carries organization information and service identification information.

In a third possible implementation manner that is provided on the basis of the first possible implementation manner, the information in the two-dimensional code includes at least one of the following items: organization information, service identification information, verification scenario information, and two-dimensional code identification information.

In a fourth possible implementation manner that is provided on the basis of the first possible implementation manner, the information in the two-dimensional code includes a URL link relevant or irrelevant to verification of the sensitive operation.

In a fifth possible implementation manner that is provided on the basis of the first, second, third, or fourth possible implementation manner, the memory of the terminal further includes instructions for performing the following operations:

receiving, by the second terminal device, a verification result returned by the verification server, and displaying a processing result of the sensitive operation on the first terminal device and/or the second terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

According to another aspect, still another embodiment of the present invention further provides a computer readable storage medium, where the computer readable storage medium may be a computer readable storage medium included in a memory in the foregoing embodiment, and may also be a computer readable storage medium that exists separately and has not been assembled into a terminal. The computer readable storage medium stores one or more programs. The one or more programs are used by one or more processors to execute a sensitive operation verification method, where the method includes:

scanning, by a first terminal device, a two-dimensional code for initiating a sensitive operation, and obtaining information in the two-dimensional code, where the information in the two-dimensional code is at least used to uniquely determine the sensitive operation; and sending, by the first terminal device, a first verification request to a verification server, where the first verification request carries verification information of the first terminal device and the information in the two-dimensional code, so that the verification server performs verification according to the verification information of the first terminal device, where the verification information is used to determine user identity information; and allowing, when the verification succeeds and in a state that does not require a user to log in, the sensitive operation that is determined by the information in the two-dimensional code and corresponding to the user identity information to proceed.

It is assumed that the foregoing is a first possible implementation manner, and then in a second possible implementation manner that is provided on the basis of the first possible implementation manner, before the scanning, by a first terminal device, a two-dimensional code for initiating a sensitive operation, the method further includes:

registering the user identity information and the verification information of the first terminal device, and determining a binding relationship between the user identity information and the verification information.

In a third possible implementation manner that is provided on the basis of the first or second possible implementation manner, the verification information of the first terminal device includes at least one of the following items: a user identifier, an identifier of the first terminal device, and an application identifier of the first terminal device.

In a fourth possible implementation manner that is provided on the basis of the first possible implementation manner, the two-dimensional code is provided by a second terminal device that initiates the sensitive operation.

In a fifth possible implementation manner that is provided on the basis of the first possible implementation manner, the information in the two-dimensional code includes at least one of the following items: organization information, service identification information, verification scenario information, and two-dimensional code identification information.

In a sixth possible implementation manner that is provided on the basis of the first or fifth possible implementation manner, the information in the two-dimensional code further includes a URL link relevant or irrelevant to verification of the sensitive operation.

In a seventh possible implementation manner that is provided on the basis of the first or fourth possible implementation manner, after the sending, by the first terminal device, a first verification request to a verification server, the method further includes:

receiving, by the first terminal device, a verification result returned by the verification server, and displaying a processing result of the sensitive operation on the first terminal device and/or the second terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

According to another aspect, still another embodiment of the present invention further provides a computer readable storage medium, where the computer readable storage medium may be a computer readable storage medium included in a memory in the foregoing embodiment, and may also be a computer readable storage medium that exists separately and has not been assembled into a terminal. The computer readable storage medium stores one or more programs. The one or more programs are used by one or more processors to execute a sensitive operation verification method, where the method includes:

sending, by a second terminal device, a sensitive operation request to a sensitive operation server, where the sensitive operation request at least carries verification scenario information, so that the sensitive operation server separately sends a second verification request to a two-dimensional code server and a verification server, where the second verification request carries the verification scenario information, so that the verification server sends a verification code to the two-dimensional code server, and then the two-dimensional code server generates a two-dimensional code according to the verification scenario information and the verification code.

It is assumed that the foregoing description is a first possible implementation manner, and then in a second possible implementation manner that is provided on the basis of the first possible implementation manner, the sensitive operation request further carries organization information and service identification information.

In a third possible implementation manner that is provided on the basis of the first possible implementation manner, the information in the two-dimensional code includes at least one of the following items: organization information, service identification information, verification scenario information, and two-dimensional code identification information.

In a fourth possible implementation manner that is provided on the basis of the first or fifth possible implementation manner, the information in the two-dimensional code includes a URL link relevant or irrelevant to verification of the sensitive operation.

In a fifth possible implementation manner that is provided on the basis of the first, second, third, or fourth possible implementation manner, after the sending, by a second terminal device, a sensitive operation request to a sensitive operation server, the method further includes:

receiving, by the second terminal device, a verification result returned by the verification server, and displaying a processing result of the sensitive operation on the first terminal device and/or the second terminal device according to the verification result.

In the technical solutions provided by the present disclosure, a terminal device verification manner and a conventional verification manner are combined by using a two-dimensional code, which enormously simplifies a user operation, so that a user does not need to log in, perform an input operation, and learn when performing an operation, and only needs to scan the two-dimensional code, thereby effectively improving security, and simplifying a sensitive operation process.

A person of ordinary skill in the art may understand that all or a part of the steps of the embodiments may be implemented by hardware or a program instructing relevant hardware. The program may be stored in a computer readable storage medium. The storage medium may be a read-only memory, a magnetic disk, or an optical disc.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A sensitive operation verification method, comprising: sending, by a second terminal device, a sensitive operation request to a sensitive operation server, wherein the sensitive operation request at least carrying carries verification scenario information referring to information that indicates a source website of the sensitive operation and content of the sensitive operation, so that the sensitive operation server separately sends a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code; wherein after the sending, by a second terminal device, a sensitive operation request to a sensitive operation server, and receiving, by the second terminal device, a verification result returned by the verification server, and displaying a processing result of the sensitive operation on the first terminal device and/or the second terminal device according to the verification result.

2. The method according to claim 1, wherein the sensitive operation request further carries organization information and service identification information.

3. The method according to claim 1, wherein the information in the two-dimensional code comprises at least one of the following items: organization information, service identification information, verification scenario information, and two-dimensional code identification information.

4. The method according to claim 1, wherein the information in the two-dimensional code comprises a URL link relevant or irrelevant to verification of the sensitive operation.

5. A sensitive operation verification method, comprising: receiving, by a sensitive operation server, a sensitive operation request sent by a second terminal device wherein, the sensitive operation request at least carrying carries verification scenario information referring to information that indicates a source website of the sensitive operation and content of the sensitive operation: and separately sending, by the sensitive operation server, a second verification request to a two-dimensional code server and a verification server, the second verification request carrying the verification scenario information, so that the verification server sends a verification code to the two-dimensional code server, and then the two-dimensional code server generates a two-dimensional code according to the verification scenario information and the verification code; wherein after the sending, by a second terminal device, a sensitive operation request to a sensitive operation server, and receiving, by the second terminal device, a verification result returned by the verification server, and displaying a processing result of the sensitive operation on the first terminal device and/or the second terminal device according to the verification result.

6. The method according to claim 5, wherein the sensitive operation request further carries organization information and/or service identification information.

7. A sensitive operation verification method, comprising: receiving, by a verification server, a second verification request sent by a sensitive operation server, wherein the second verification request carrying verification scenario information referring to information that indicates a source website of the sensitive operation and content of the sensitive operation: sending, by the verification server, a verification code to the two-dimensional code server, so that the two-dimensional code server generates a two-dimensional code according to the verification scenario information and the verification code, information in the two-dimensional code being at least used to uniquely determine a sensitive operation; and performing, by the verification server after receiving a first verification request that is sent by a first terminal device and carries verification information of the first terminal device and the information in the two-dimensional code, verification according to the verification information of the first terminal device to determine whether the verification information of the first terminal device is bound with registered user identity information; and in response to determining that the verification information is bound with registered user identity information, allowing, the sensitive operation that is determined by the information in the two-dimensional code and corresponding to the registered user identity information and that is protected by the registered user information to proceed without a login operation of a user identified by the registered user identity information; wherein after the performing, by the verification server, verification according to the verification information of the first terminal device, and separately sending a verification result to the first terminal device and/or a second terminal device that initiates the sensitive operation, so that the first terminal device and the second terminal device that initiates the sensitive operation display a processing result of the sensitive operation according to the verification result.

8. The method according to claim 7, wherein before the receiving, by a verification server, a second verification request sent by a sensitive operation server, the method further comprises: registering the user identity information and the verification information of the first terminal device, and determining a binding relationship between the user identity information and the verification information.

9. The method according to claim 7, wherein the information in the two-dimensional code comprises at least one of the following items: organization information, service identification information, verification scenario information, and two-dimensional code identification information.

10. The method according to claim 9, wherein the information in the two-dimensional code further comprises a URL link relevant or irrelevant to verification of the sensitive operation.

* * * * *